United States Patent
Tin et al.

(10) Patent No.: US 9,134,447 B1
(45) Date of Patent: Sep. 15, 2015

(54) MAGNETIC STUD FINDER WITH FLEXIBLE MEMBER CARRYING MULTIPLE MAGNETIC ELEMENTS

(75) Inventors: Kevin Tin, Hacienda Heights, CA (US); Ken Ung, Arcadia, CA (US)

(73) Assignee: TCM GLOBAL INC., El Monte, CA (US)

( * ) Notice: Subject to any disclaimer, the term of this patent is extended or adjusted under 35 U.S.C. 154(b) by 739 days.

(21) Appl. No.: 13/341,445

(22) Filed: Dec. 30, 2011

Related U.S. Application Data

(60) Provisional application No. 61/428,801, filed on Dec. 30, 2010.

(51) Int. Cl.
  *G01V 3/15* (2006.01)
  *B25H 1/00* (2006.01)

(52) U.S. Cl.
  CPC ... *G01V 3/15* (2013.01); *B25H 1/00* (2013.01)

(58) Field of Classification Search
  None
  See application file for complete search history.

(56) References Cited

U.S. PATENT DOCUMENTS

| | | | |
|---|---|---|---|
| 2,723,369 A | 6/1955 | Brummett | |
| 2,772,394 A * | 11/1956 | Bradley | 324/674 |
| 3,147,176 A * | 9/1964 | Haslam | 428/55 |
| 3,363,208 A | 1/1968 | Balet | |
| 3,823,365 A * | 7/1974 | Anderson | 324/328 |
| 3,845,384 A | 10/1974 | Stoutenberg et al. | |
| 5,148,108 A | 9/1992 | Dufour | |
| 6,064,201 A | 5/2000 | Cha et al. | |
| 6,229,294 B1 | 5/2001 | Wun | |
| 6,301,754 B1 * | 10/2001 | Grunberger et al. | 24/303 |
| 6,434,801 B2 * | 8/2002 | Grunberger | 24/303 |
| 6,456,053 B1 | 9/2002 | Rowley | |
| D472,164 S | 3/2003 | Newton | |
| 6,696,827 B2 | 2/2004 | Fazekas et al. | |
| D496,292 S | 9/2004 | Sowers | |
| 6,978,503 B2 | 12/2005 | Del Cogliano | |
| 7,183,885 B2 | 2/2007 | Nellessen et al. | |
| 7,187,261 B2 * | 3/2007 | Cassar | 335/306 |
| D614,980 S | 5/2010 | Junes | |

FOREIGN PATENT DOCUMENTS

WO    WO 03090236 A1 * 10/2003

* cited by examiner

*Primary Examiner* — Paresh Patel
(74) *Attorney, Agent, or Firm* — Vista IP Law Group LLP; Gary D. Lueck

(57) ABSTRACT

An apparatus for use in detecting at least one object hidden behind a wall or surface such as a metal fastener finder or a metal stud finder including a handle and a flexible member. The handle has a proximal end and a distal end and has a size and shape for being grasped by a hand of a user. The flexible member extends from the distal end of the handle, is movable or bendable independently of the handle, and includes multiple magnetic elements that are spaced apart from each other such that when a magnetic element is attracted to at least one hidden object, the flexible member bends to accommodate magnetic attraction between the at least one magnetic element and the at least one hidden object.

32 Claims, 8 Drawing Sheets

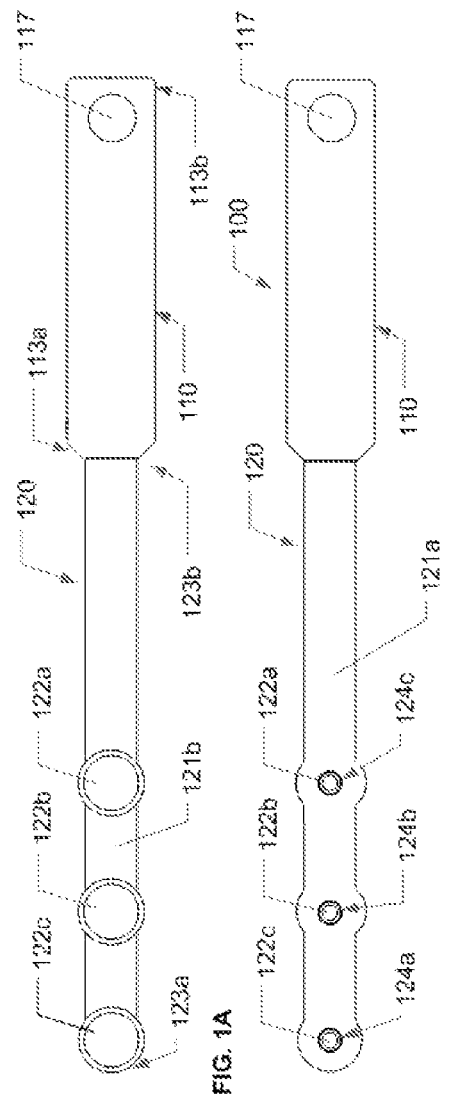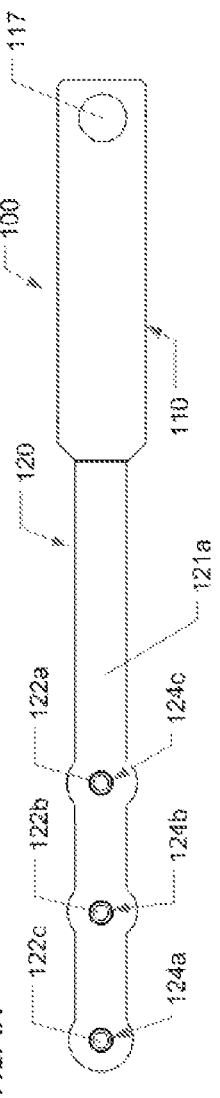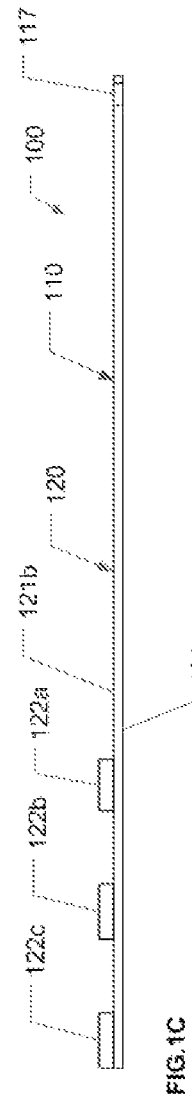

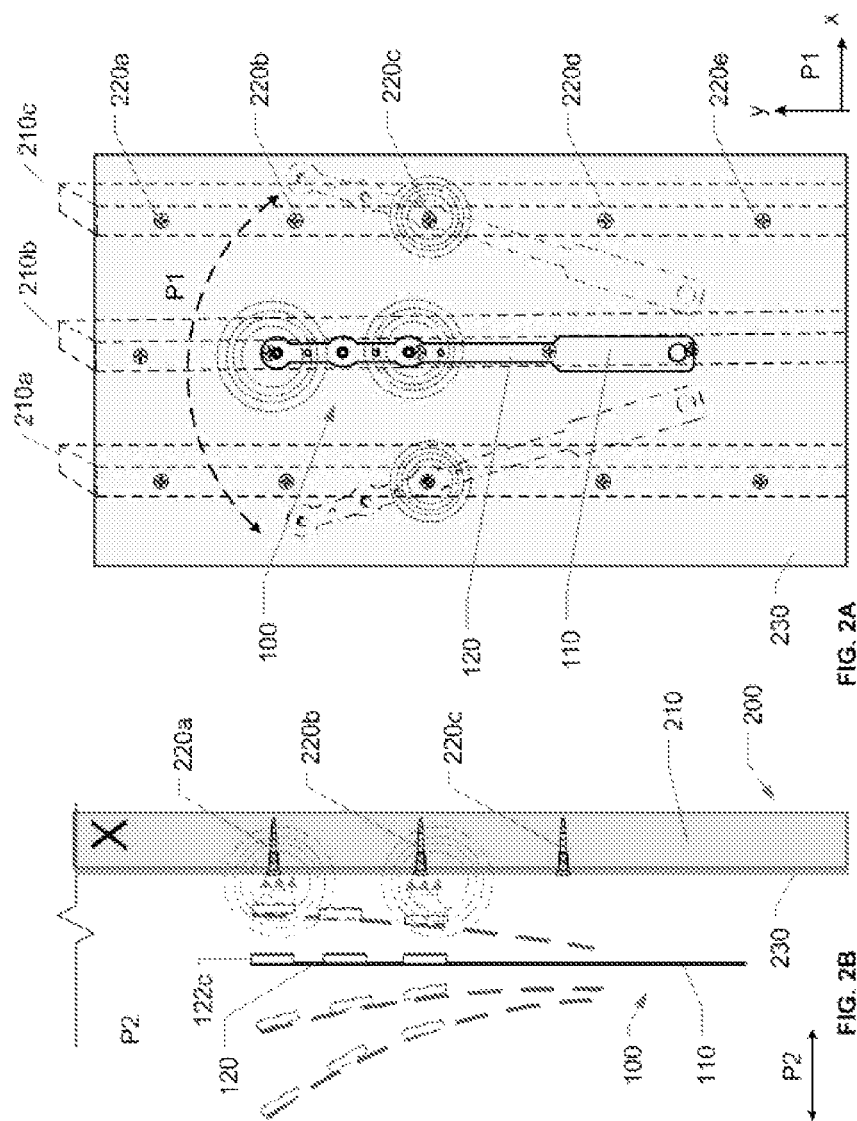

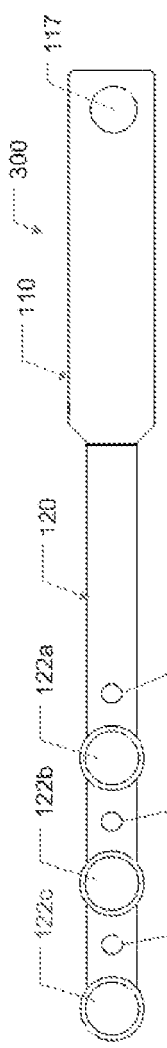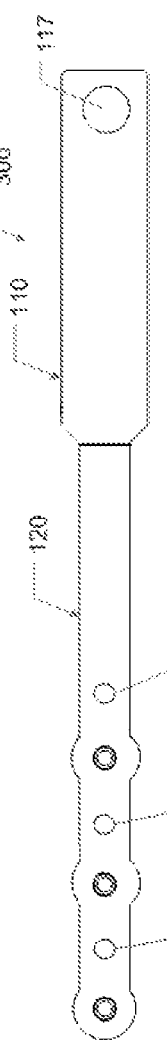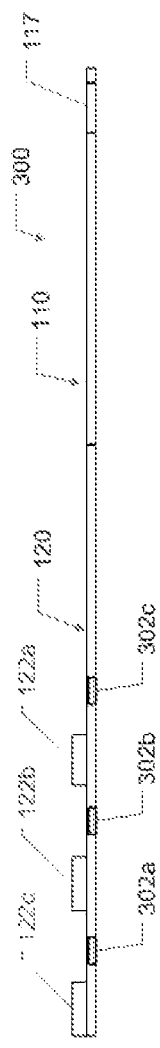

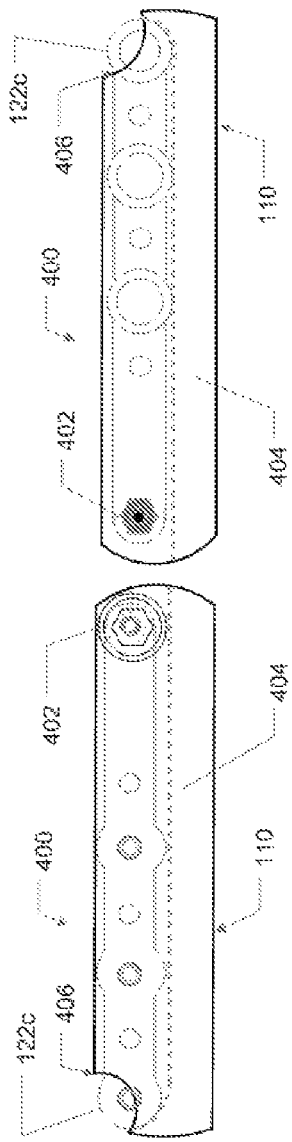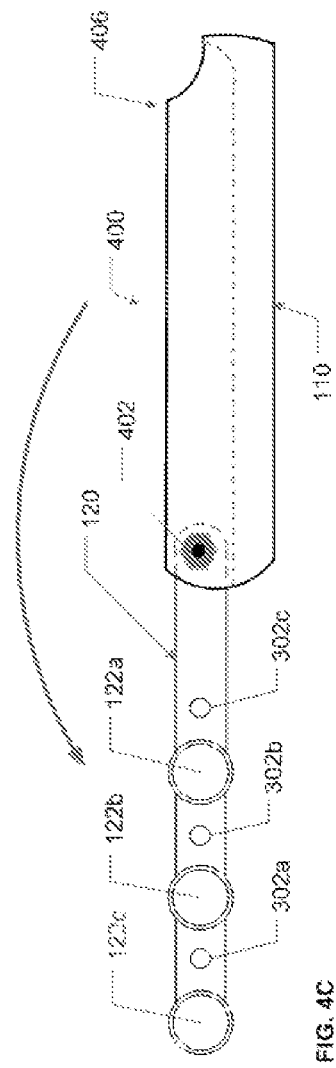
FIG. 4A  FIG. 4B  FIG. 4C

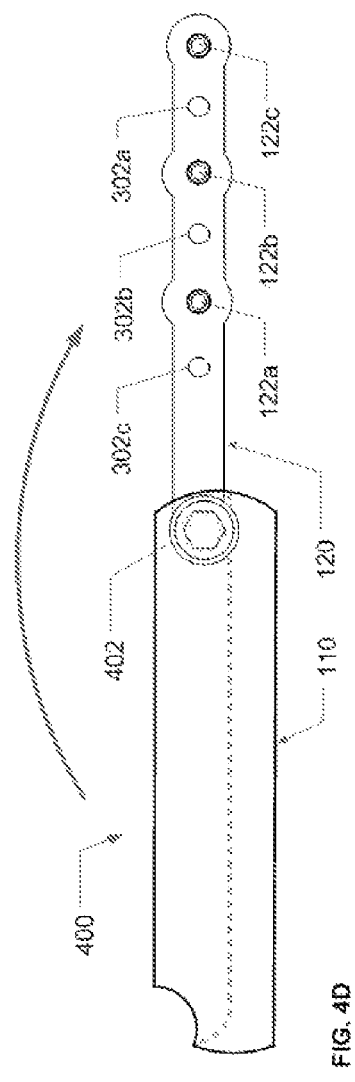
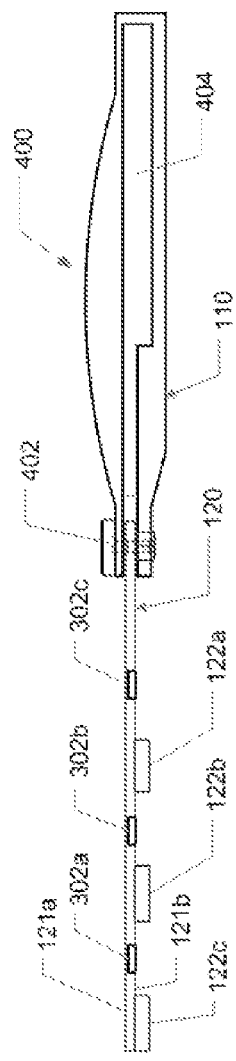
FIG. 4D
FIG. 4E

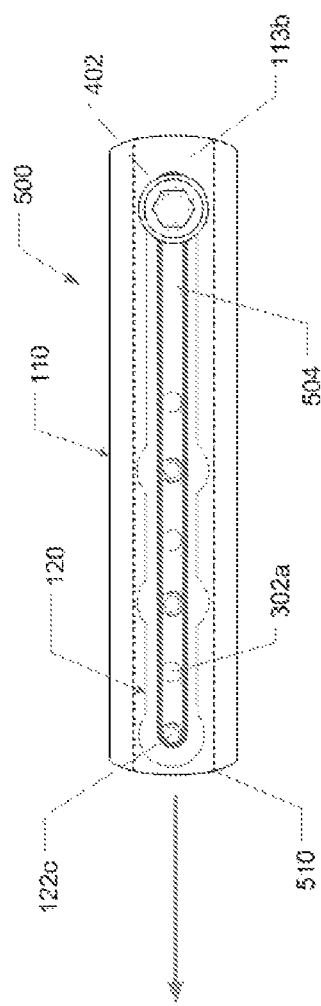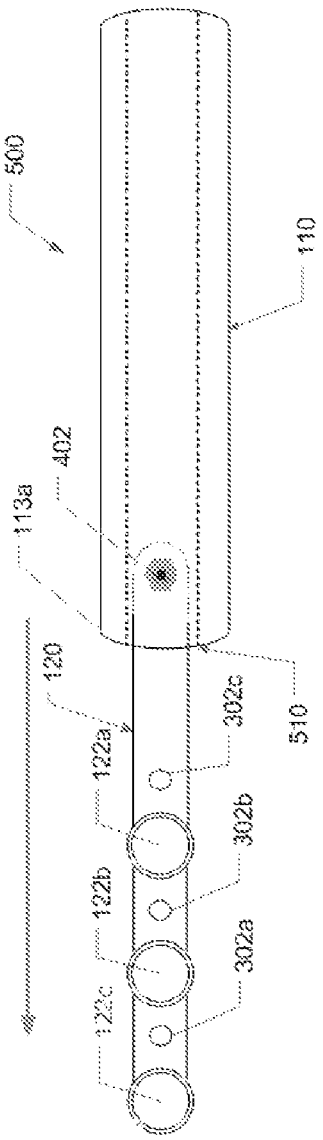
FIG. 5A
FIG. 5B

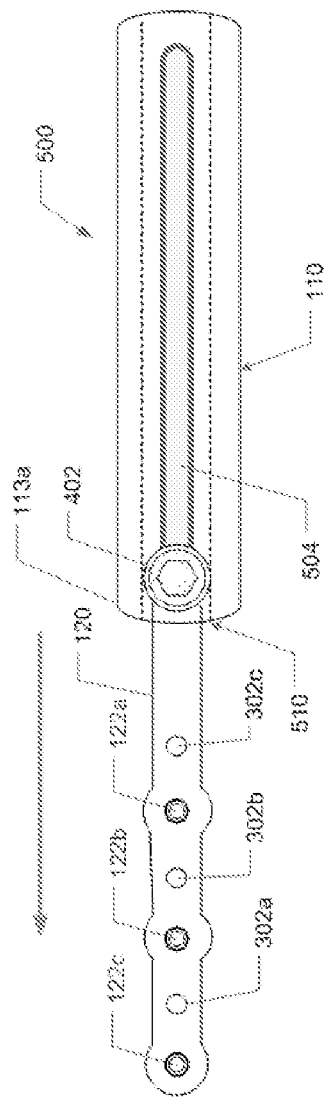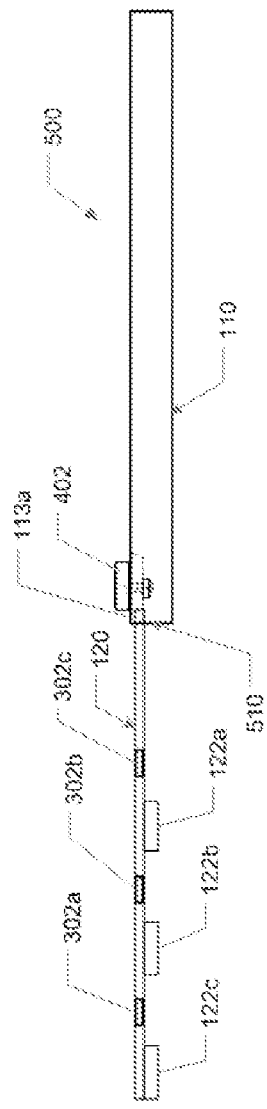
FIG. 5C
FIG. 5D

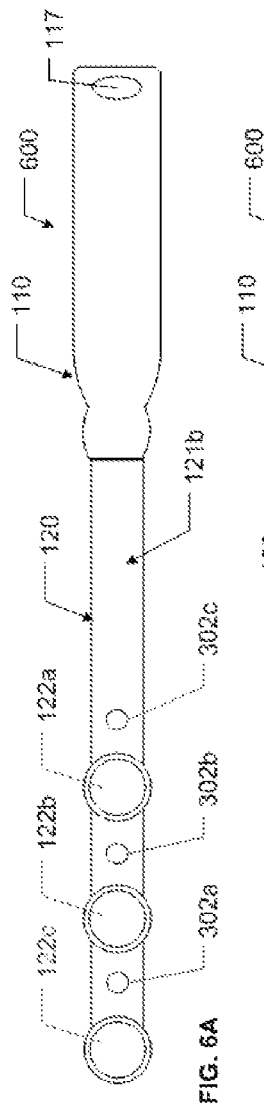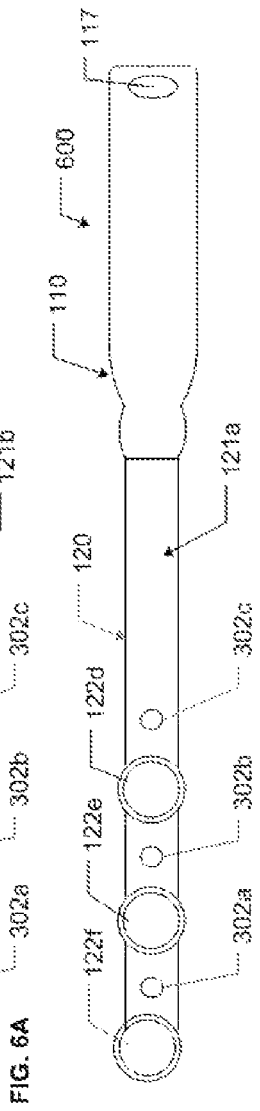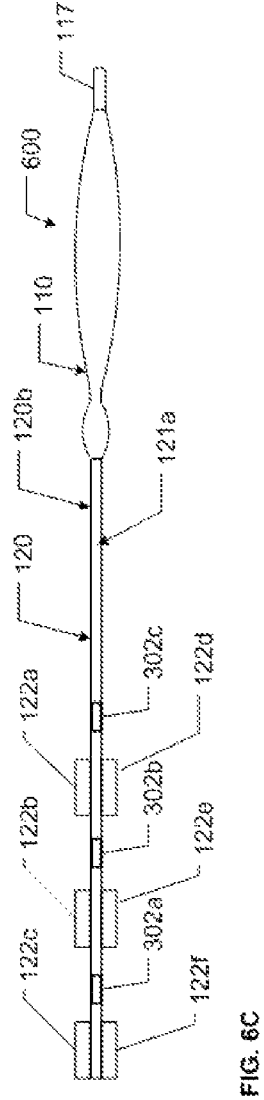

MAGNETIC STUD FINDER WITH FLEXIBLE MEMBER CARRYING MULTIPLE MAGNETIC ELEMENTS

CROSS-REFERENCE TO RELATED APPLICATION

This application claims priority under 35 U.S.C. §119 from provisional U.S. Application Ser. No. 61/428,801 filed Dec. 30, 2010, the contents of which are incorporated herein by reference as though set forth in full.

BACKGROUND

Embodiments are related to hand held magnetic devices for detecting metallic elements, e.g., metallic elements hidden by a wall or surface. Magnetic stud finders are well known. One example of which utilizes a magnetized chain or a magnet attached to a distal or bottom end of the chain. During use, a user holds a proximal fixture such that the magnet is suspended by the chain and swings the chain parallel to a wall surface (like a chained pendulum of a clock) until the magnetized chain or magnet detects a metal stud behind the wall. Given the manner in which the chain and magnet are structurally configured, however, the chain must be utilized in a particular manner, i.e., the chain always hangs down from the fixture given the structure of the chain. Chain magnetic stud finders are also inconvenient since they may be difficult to store in a tool belt or pocket, and the chain may become tangled with other items or damaged. Detection capabilities of chain-based magnetic stud finders are also limited.

Another known magnetic stud finder includes an integrated handle and base including a magnet that extends across a substantial length of the handle. Such devices, however, involve the user moving both the handle and the integrated magnet, and smaller magnetic forces between the magnet and an individual fastener may not be detected by the user given that the user's own force and movement may negate or diminish detection of such magnetic forces and thus negate or diminish the usefulness of such devices. Thus, while such integrated devices may improve upon convenience issues of chain-based stud finders, they are not particularly suitable for various detection applications including location fasteners within non-metal studs, e.g., location of individual fasteners within wood studs, which is common in residential construction.

Thus, while known magnetic stud finders may have limited effectiveness, they have a number of shortcomings and disadvantages that inhibit their use and often result in frustration and inconvenience to users.

SUMMARY

Embodiments relate to devices that are capable of locating a hidden object such as a nail, a screw or other fastener behind a wall or within a stud utilizing a flexible member that extends from a handle grasped by a hand of the user and carries magnetic elements.

One embodiment is directed to an apparatus for use in detecting at least one object hidden behind a wall or surface and includes a handle and a flexible member. The handle has proximal and distal ends and is configured or having a shape and size for being grasped by a user's hand. The flexible member extends from the distal end of the handle (and thus is not grasped by the user's hand as is the handle) and comprises multiple magnetic elements which, according to one embodiment, are spaced apart from each other. The flexible member and magnetic elements are configured such that when a magnetic element is attracted to at least one hidden object, the flexible member bends or curves to accommodate magnetic attraction between at least one magnetic element and at least one hidden object. Thus, magnets of the flexible member (and not within the handle grasped by a user's hand), are attracted to the hidden object.

A further embodiment is directed to an apparatus for use in detecting at least one object hidden behind a wall or surface and comprises a handle and a flexible member. The handle has proximal and distal ends and is configured, or shaped and sized, to be grasped by a user's hand. The flexible member extends from the distal end of the handle and comprises a plurality of magnetic elements spaced apart from each other. Further, the flexible member has a differential stiffness such that such that the flexible member is more flexible in a first plane that is substantially orthogonal to a second plane, which is defined by the wall or surface against which the apparatus may be placed during use. When a magnetic element is attracted to at least one hidden object, the flexible member bends or curves to accommodate magnetic attraction between the at least one magnetic element and the at least one hidden object.

Yet another embodiment is directed to an apparatus for use in detecting at least one object hidden behind a wall or surface and comprises a handle and a flexible, plastic strip. The handle has proximal and distal ends and is configured for being grasped by a hand of a user. The flexible, plastic strip extends from the distal end of the handle and includes multiple magnetic elements that are spaced apart from each other. The magnetic elements are located distally relative to a distal end of the handle.

Further embodiments are directed to methods of detecting an object hidden behind a wall or surface with apparatus embodiments and methods of using such apparatus.

In a single or multiple embodiments, embodiments are configured to detect an object that is a fastener such as a nail, screw or staple, within a wood stud, and the apparatus is operable to detect the fastener when the apparatus is moved along a wall or surface and toward the wood stud or surface covering the wood stud and bends toward the fastener as a result of magnetic attraction. In a single or multiple embodiments, the plurality of magnets is arranged and has magnetic strength to detect a single fastener hidden within the wood stud. Other embodiments involve detection of a metal stud or other metal object.

In a single or multiple embodiments, the flexible member has differential stiffness such that the flexible member is more flexible in one direction or in a first plane that is substantially orthogonal to a second direction or second plane defined by the wall or surface. The differential stiffness may also involve the flexible member being configured to stand substantially upright when the handle and the flexible member are arranged in an upright position. Further, the differential stiffness may allow the flexible member to be positioned in an upright manner (e.g., standing on side) such that respective axes defined through respective centers of respective magnetic elements are substantially parallel to a ground plane, and the flexible member remains substantially rigid and parallel to the ground plane due to the stiffness in that direction, whereas as the handle is rotated (e.g., from 0 degrees of the original position to 90 degrees), the flexible member falls and bends toward the ground.

In a single or multiple embodiments, a longitudinal axis of the flexible member remains substantially parallel to a longitudinal axis of the handle when the handle is oriented at an angle relative to a vertical axis. For example, the angle may be about 15 to about 45 degrees.

In a single or multiple embodiments, the flexible member comprises multiple, e.g., three, magnets spaced apart from each other.

In a single or multiple embodiments, the flexible member is rotatable relative to the handle. For this purpose, in one embodiment, the handle defines a slot in a surface or side thereof, and a distal portion of the handle comprises a pivot element such that a proximal portion of the flexible member is attached to the pivot element and is rotatable between a first, stored position in which the flexible member is positioned inside of the slot of the handle and a second, extended position by being rotated outwardly or away from the slot about the pivot element to an extended position for detection. In another embodiment, rather than utilizing a rotating configuration, the flexible member is slidable, and the handle includes a connector that is slidable along at least a portion of the handle. For this purpose, a proximal portion of the flexible member is attached to the connector that is slidably moved or linearly translated from a first, stored position in which the flexible member is positioned inside of the slot of the handle to a second, extended position. According to one embodiment, the handle may define a slot at its distal end in which the flexible member may be moved.

According to one or more embodiments, given the handle and flexible member configuration, the flexible element is not a chain and does not move as a chain does when held from above since, give the material (e.g., plastic) and structure of the flexible member of embodiments, a distal end or portion of the flexible member bends by a greater amount or degree compared to a proximal end or portion of the flexible member or, in other words, the distal end or portion will travel a larger arc compared to the proximal end or portion.

In a single or multiple embodiments, the flexible element having a different shape compared to the handle, e.g., the handle is configured to be grasped by fingers or a hand of a user, whereas the flexible member is a strip that is not held by the user during use since the user's hand is located below the flexible member, on or around the handle. In this manner, the flexible element is movable relative to the handle, and the handle and the flexible element are positioned relative to each other such that the plurality of magnets are located distally of a distal end of the handle and distally of the user's hand that grasps the handle but not the flexible member. Accordingly, the elements that are actually attracted to a fastener move with the flexible member relative to the handle, and the user's hand does not cover magnetic elements since the user's hand grasps the handle instead. Further, while the handle and flexible member may be moved along the wall, the flexible member is movable independently of the handle when the flexible member flexes back and forth toward or away from a wall.

In a single or multiple embodiments, the magnets being encased within the flexible member, and the handle and the flexible member may be made of different materials. In certain embodiments, magnets are attached to the flexible member and exposed. Thus, the magnets are not contained within or affixed to the handle since the user's hand grasps or wraps around the handle rather than the flexible member.

BRIEF DESCRIPTION OF THE DRAWINGS

FIGS. 1A-C illustrate one embodiment of a magnetic stud finder including a flexible strip having differential bendability extending from a handle, wherein FIG. 1A is a bottom view of the magnetic stud finder, FIG. 1B is a top view of FIG. 1A, and FIG. 1C is a side view of FIG. 1A;

FIGS. 2A-B illustrate a method of locating an individual fastener within a stud utilizing a magnetic stud finder constructed according to one embodiment by moving the flexible strip across a wall, wherein FIG. 2A illustrates a view from a user's perspective and with respect to a plane that is substantially perpendicular to a plane of a wall or surface and in which the flexible strip can flex or bend, and FIG. 2B illustrates a view along a plane parallel to the wall or surface in which the flexible strip is substantially rigid;

FIGS. 3A-C illustrate a further embodiment of a magnetic stud finder including a flexible strip having differential bendability extending from a handle and one or more marking holes defined through the flexible strip, wherein FIG. 3A is a bottom view, FIG. 3B is a top view of FIG. 3A, and FIG. 3C is a side view of FIG. 3A;

FIGS. 4A-E illustrate a further embodiment of a magnetic stud finder including a flexible strip having differential bendability and in which the flexible strip is rotatably coupled to a distal end of a handle and configured such that the flexible strip can be rotatably removable from and insertable within the handle, wherein FIG. 4A is a bottom view in which the flexible stud finder has been rotatably removed from an aperture or slot defined by the handle, FIG. 4B is a top view of FIG. 4A, and FIG. 4C is a side view of FIGS. 4A-B, FIG. 4D is a bottom view in which the flexible stud finder has been rotatably inserted into the aperture or slot defined by the handle to store the flexible strip within the handle, and FIG. 4E is a top view of FIG. 4D;

FIGS. 5A-D illustrate a further embodiment of a magnetic stud finder including a flexible strip having differential bendability and in which the flexible strip is slidably removed from and retracted into a handle, wherein FIG. 5A is a bottom view in which the flexible stud finder has been slidably removed from an aperture or slot defined by a distal end of the handle, FIG. 5B is a top view of FIG. 4A, FIG. 5C is a side view of FIGS. 5A-B, and FIG. 5D is a top view showing how the flexible strip is slidably retracted into the handle; and FIGS. 6A-C illustrate a further embodiment of a magnetic stud finder including a flexible strip having differential bendability and magnets disposed on both sides of the flexible strip to provide bi-directional detection capabilities, wherein FIG. 5A is a bottom view, FIG. 6B is a top view, and FIG. 6C is a side view of the embodiment.

DETAILED DESCRIPTION OF ILLUSTRATED EMBODIMENTS

Embodiments relate to magnetic stud finders that have a handle and a flexible substrate or member that extends from the handle and includes multiple spaced magnets capable of detecting a metal stud and capable of detecting individual metallic fasteners within non-metal studs such as nails and screws within wood studs. For ease of explanation, reference is made to fasteners in the form of metallic nails.

In contrast to known devices, magnetic stud finders constructed according to embodiments utilize a flexible member, which is not a chain, and that is substantially rigid in one plane, i.e., parallel to a plane defined by a wall or surface against which the stud finder is moved or orthogonal relative to the plane of flexibility or motion of the flexible member, and that can flex or bend in the orthogonal direction, i.e., orthogonal to the plane defined by the wall or surface such that the flexible member bends or flexes toward and away from the person holding the handle, which is held or grasped by fingers or a hand of the user. Thus, with embodiments, the user does not hold or manipulate a housing containing magnets and instead, holds or manipulates a handle from which the flexible member extends. Certain embodiments are able to remain affixed to a wall as a result of magnetic attraction between a magnet of the flexible member and an individual metallic fastener, whereas other embodiments may be attracted to a fastener or other metallic element while not remaining affixed to the wall unsupported due in part to the weight of the handle, flexible member and/or the weight and/or number of magnetic elements (e.g., when multiple magnets are utilized). Further aspects of embodiments and methods of use thereof are described with reference to FIGS. 1A-6C.

Referring to FIGS. 1A-C, a magnetic stud finder or individual fastener finder 100 (generally, "magnetic stud finder") constructed according to one embodiment comprises a handle 110 and a flexible strip, substrate or member 120 (generally, "flexible strip" 120) extending from a distal end 111a of handle 110. Proximal portion or end 113b of handle 110 may include an eyelet 117 that may be utilized to attach magnetic stud finder 110 to a clip on a tool belt or other storage device. Flexible strip 120 has a top surface 121a and a bottom surface 121b which, as shown in the illustrated embodiment, includes multiple discrete magnets 122a-c (generally, "magnet 122") attached thereto. As shown in FIG. 1B, portions of respective magnets 122a-c or non-magnetic base members supporting magnets 122 may be inserted within or extend through respective apertures 124a-c and attached or secured therein with an adhesive or other method or material. Magnets 122 may also be attached directly to flexible member 120 without use of apertures 124. While magnets 122a-c are shown as being attached to bottom surface 121b, the may be partially or completely encased or embedded within the body of flexible strip 120. Thus, magnets 122 may or may not be exposed such that the magnets 122 may or may not be encased within the flexible member 120 or, in other words, the magnets 122 can be attached to an outer surface of the flexible member 120 and completely or partially exposed rather than being disposed or encased within the flexible member 120.

Handle 110 and flexible strip 120 are configured relative to each other such that handle 110 is grasped within a hand (not illustrated in FIGS. 1A-C) of a user (such as a carpenter, contractor, resident, home owner or renter) such that the handle is disposed between a thumb and index finger or the user's hand wraps partially or completely around the handle, while the flexible strip 120 extends and is suspended from distal portion or end 111a of handle 110. In other words, in contrast to certain known magnetic stud finders, in the illustrated embodiment, handle 110 and flexible strip 120 are not integrally formed as a single unit and the user does not hold a housing containing magnets, and instead, flexible strip 120 extends from handle 110. Thus, for example, it is possible to move the handle side to side or rotate handle 110 such that handle 110 moves a certain distance, but different portions of flexible member 120 may in turn be moved within the same and/or orthogonal planes and/or be rotated by different distances or arcs as a result of not being integrated within the handle 110.

According to embodiments, and with further reference to FIGS. 2A-B, flexible member 120 has differential flexibility or stiffness attributes such that flexible member 120 is substantially rigid and inflexible in a lateral direction or within plane (P1) parallel to wall, but is flexible and bendable from distal end 113a of handle 110 to flex or bend within a plane (P2) that is substantially perpendicular to wall or in a plane of motion between the wall and the user. In other words, flexible member 120 is flexible or bendable in a single plane such that flexible member 120 can bend toward and away from the user, and toward and away from a wall, whereas flexible member 120 is substantially rigid and maintains its shape as it is moved in an orthogonal plane defined by a surface or wall, e.g. while the user waves or moves the magnetic stud finder 100 along a wall.

Flexible member 120 for use in detecting a stud or individual nail may be in the form of a strip of a flexible material such as plastic, aluminum and other suitable flexible materials or materials having a structure to impart flexibility, and may have a width (W) of, for example, about ½" to about ⅝", e.g., about ⅝" in one embodiment, a thickness (T) of, for example, about 1/16" to about ¼", e.g., about 1/16" in one embodiment, and a length (L) of, for example, about 6" to about 12", e.g., about 11" in one embodiment. It will be understood that one or more or all of the dimensions may vary with, for example, one or more of the type of material, material properties and consistency (e.g., if the stiffness and/or certain dimensions vary over the length of the flexible member 210), a degree of flexibility, a size of the flexible member 120 relative to the handle 110, and an overall size of the device.

For example, referring to FIGS. 2A-B, magnetic stud finders 100 constructed according to embodiments may be utilized to detect a metal stud 210 or framing or support member (generally, "stud" 210) (three studs 210a-c are shown) and, in contrast to known devices, may also be utilized to detect an individual metallic fastener 220 (such as a nail, screw, staple or other fastener or other metallic element that is attracted to a magnet 122) (screws 220a-e in each stud 210 are shown in FIG. 2A and screws 220a-c are shown in FIG. 2B) within a metal support, frame or stud 210 or a non-metal support, frame or stud 210 such as a wood, plastic or other non-metallic stud 210 that is made of a material that does not result in magnetic attraction to any magnet 122. In the illustrated embodiment, studs 210 are non-metallic studs, e.g., wood studs, each of which includes one or more nail fasteners 220 (each wood stud 210 is illustrated in FIGS. 2A-B as including three nails 220 to illustrate one manner in which embodiments may be implemented). Studs 210 and nails 220 are covered or hidden by one or more layers of one or more materials 230 such as drywall, primer, insulation, paper, paint, plaster and/or other building materials.

FIGS. 2A-B show x, y and z axes. The "x" axis is a horizontal or "left-right" axis that is parallel to a plane defined by the wall 200. The "y" axis is the axis is a vertical axis defined by a longitudinal axis of the handle 110 and/or flexible member 120 and that is also parallel to the plane defined by wall 200. A lateral plane P1 is defined by the "x" and "y' axes. The "z" axis is orthogonal to the "x" and "y" axes and extends into wall 200 or toward the user in an orthogonal plane P2.

During use when the user desires to locate a nail 220 within a wood stud 210, user holds the handle 110 such that the flexible member 220 is placed against the wall 200 or adjacent to or near the wall 200. One manner of utilizing the magnetic stud finder 100 is to hold the handle 110 and flexible member 220 in an upright manner such that flexible member 220 extends upwardly from handle 110, which is possible due to the lateral stiffness or rigidity of flexible member 220 that allows flexible member 220 to stand substantially upright from handle 110 in contrast to, for example, a magnetic chain that has no such structural capabilities. For example, as shown in FIG. 2A, magnetic stud finder 110 can be waved or moved across wall 200 such that flexible member 120 remains substantially rigid or straight and does not flex "sideways" and instead may be oriented at various angles (e.g., an angle of 45 degrees relative to a vertical to sweep a total of 90 degrees or other angles in which flexible member 120 has at least a partial upward orientation.

According to embodiments, and as shown in FIGS. 2A-B, flexible member 120 has differential stiffness or flexibility such that flexible member 120 can flex or bend relative to distal end 113a of handle 110 in one plane or direction (i.e., within P2 along the "z" axis away from and toward the user as shown in FIG. 2B) but is substantially rigid in plane P1 defined by the "x" and "y" axes orthogonal to the "z" axis. While flexible member 120 may bend toward or away from user when magnetic stud finder 100 is in an upright orientation (as shown in FIG. 2A), flexible member 120 is not so flexible so as to fall back upon itself like a chain. With this configuration, user moves or rotates handle 110 which moves or rotates flexible member 120, e.g., across portions of wall 200 of interest between a left Position 1 (Pos1) and right Position 2 (Pos2).

In the illustrated embodiment, while the user is moving magnetic stud finder 100 across wall 200, flexible member 120 may flex back and forth away from and toward the user as the user attempts to locate nail 220. In the illustrated embodiment, when magnet 122 is in proximity to nail 220 such that a magnet 122 is positioned over or adjacent to nail 220, a middle magnet 122 and/or a top or distal magnet 122 is attracted to respective individual nails 200 within respective wood studs 210 (represented by attraction force circles) such that when magnets 122 are over or adjacent to respective nails 200, they are attracted to nails 200 which, in turn, causes flexible member 120 to flex or bend toward nail 220 within the stud 210 in the wall 200. The degree to which flexible member 120 flexes or bends depends in part upon the distance between the magnet 122 and wall 200, the strength of magnet 122, and the stiffness profile along the length of flexible member 120.

For example, with respect to a vertical (V) defined by an axis of a stationary handle 110, flexible member 120 may bend in a continuous, arcuate manner such that distal end 123a of flexible member 120 is at a location that forms an angle of about 15 to about 45 degrees relative to the vertical. Given that flexible member 120 is attached to or extends from distal end 113a of handle 110, distal end 123a of flexible member 120 may have a higher degree of bendability compared to a proximal end 123b of flexible member, which has a lower degree of bendability due to support by distal end 113a of handle 110.

According to embodiments, flexible member 120 includes multiple magnets 122, e.g., three magnets 122a-c as shown in FIGS. 1-3, and one of which is at distal end 123a, but other numbers of magnets 122 may be utilized. According to one embodiment, flexible member 120 has a length of about 11" as noted above and has three magnets 122a-c that are spaced apart from each other. Pre-determined magnet 122 spacing increases the likelihood that an individual magnet 122 will catch or be attracted to an individual nail 220 as magnetic stud finder 100 is moved across wall 200. It will be understood that embodiments may involve other numbers, sizes and pre-determined magnet 122 spacings, which may be spaced equidistant from each other, or certain magnets 122 may be closer to each other than other magnets 122, and magnet 122 spacing may depend on, for example, the length of the flexible member 120 and the size, strength of weight of magnets 122 as contributing to bending of the flexible member and the shape of flexible member 120 when bent, which is also depends in part upon flexible member 120 configurations and materials. It should be understood that flexible member 120 may be different shapes and sizes and made of other materials to impart differential flexibility attributes described. Thus, FIGS. 1A-C and 2A-B are provided for purposes of illustrating how embodiments of the invention may be implemented, and embodiments may involve other dimensions and spacing.

According to one embodiment, handle 110, flexible member 120 and magnets 122 are of such size and made of such lightweight materials such that the device may or may not stick to wall 200 without external support. For example, the strength of a single magnet 122 and the attraction between that single magnet 122 and a single fastener 220 can cause magnetic stud finder 100 to be maintained or stick to wall 200 at the location of the detected fastener 220 without external support or assistance by the user. Having the magnetic stud finder 100 remain on wall 200 at the detection location assists the user in identifying the location of nail 220 and corresponding stud 210. In other embodiments, magnetic stud finder 100 is of sufficient weight, e.g., due to the weight of one or both of the handle 110 and flexible member 120 having multiple magnets 122, such that the magnetic stud finder 100 is not maintained at a position on wall 200 without external user support and instead slowly slides down wall 200 or falls off of wall 200 in the absence of user support, while the location of the fastener 220 and stud 210 is still identified given the manner in which the flexible member 120 is structured when held by the user.

Referring to FIGS. 3A-C, a magnetic stud finder or individual fastener finder 300 constructed according to another embodiment comprises a handle 110 and a flexible strip, substrate or member 120 as described above, and the flexible member 120 includes one or more marking holes 302 (three marking holes 302a-c are shown) formed through the flexible strip 120. During use, after nail 220 is detected, while magnetic stud finder 100 is held against wall 200 by the user or maintained to wall 200 by magnetic attraction, the user can mark the location of the stud 210 through holes 302.

Referring FIGS. 4A-E, a magnetic stud finder or individual fastener finder 400 constructed according to another embodiment comprises a handle 110 and a flexible strip, substrate or member 120 as described above, and is structured such that flexible member 120 is movable relative to the handle 110 and can be removed from or inserted into and stored within a portion of handle 110.

In one embodiment, as illustrated in FIGS. 4A-B, flexible member 120 (e.g., as shown in FIGS. 3A-C) is joined to distal end or portion 113a of handle 110 by a screw, nut, pin, hinge or other suitable connector 402 (generally, "connector" 402) such that flexible member 120 can rotate about a shaft of the connector 402. A slot or aperture 404 extends within a substantial length of the handle 110 and has a shape and size to accommodate flexible member 120 and magnets 122 therein, and proximal portion or end 113b of handle 110 may have a groove 406 to accommodate distal magnet 122c which, according to one embodiment, can be grasped and moved by the user to rotate (represented by arrows) the flexible member 120 from a first, stored position (FIGS. 4A-B), moved in an angular manner about the connector 402 to a second, open position (FIGS. 4C-E). The user may then hold handle 110, apply the bottom surface 121b of flexible member 120 having magnets 122 to wall 200 surface to locate stud 210 or individual fastener 220 as discussed above. When finished, the user may again grasp and rotatably move, e.g., distal magnet 122c, from the second, open position back to the first, closed position to place the flexible member 120 back into handle 110 for storage. Handle 110 and flexible member 120 are configured such that magnetic stud finder 100 can be easily placed in a user's pocket or tool belt.

Referring FIGS. 5A-D, a magnetic stud finder or individual fastener finder 500 constructed according to another embodiment comprises a handle 110 and a flexible strip, substrate or member 120 as described above, and is structured such that flexible member 120 is slidable relative to the handle 110 and can be removed from or inserted or retracted into and stored within a portion of handle 110.

For example, as shown in FIG. 5A, proximal portion 123b of flexible member 120 is attached to a connector 402 that is movable within a slot 504 defined by a top surface 506 of handle 110. Connector 402 may be manually translated from a first position adjacent to proximal end 113b of handle 110 to an extended position adjacent to distal end 113a which, in turn, causes flexible member 120 attached thereto to be moved from a first, stored position within a slot or aperture 510 defined within handle to a second, extended position where magnets 122 are located outside of handle 110. Thus, rather than grasping a magnet 122 and rotating the flexible member 120, flexible member 120 may be pushed out or ejected from handle 110 without the user contacting flexible member 120. The user may then hold handle 110, apply bottom surface 121b of flexible member having magnets 122 to wall 200, and locate a metal stud 210 or an individual fastener 220 as discussed above. When finished, the user may slide the connector 502 back to the first, closed position to retract flexible member 120 back into handle 110 for storage. Handle 110 and flexible member 120 are configured such that magnetic stud finder 100 can be easily placed in a user's pocket or tool belt.

According to one embodiment, the embodiment illustrated in FIGS. 5A-D may involve a hand tool such as a hammer or other tool that is utilized when a stud 210 or fastener 220 is to be located. For example, flexible member 120 and magnets 122 may be slidably ejected from the bottom of the hammer, in which case the handle of the hammer may serve as handle 110 of magnetic stud finder 100, and after the magnetic stud finder 110 has been utilized, flexible member 120 can be retracted into the bottom of the hammer.

Referring FIGS. 6A-C, a magnetic stud finder or individual fastener finder 600 constructed according to another embodiment comprises a handle 110 and a flexible strip, substrate or member 120 as described above, and is structured such that flexible member 120 has magnets 122 on both sides thereof to provide bi-directional detection capabilities. Further, as shown in FIG. 6C, the handle 110 may be configured or shaped for positioning within a hand of the user such that the user may grasp the handle 110 and wrap fingers around the handle 110. Thus, for example, in certain embodiments, the handle may be held in a user's hand or grasped between a thumb and index finger, or the handle may be grasped by a user's hand that is wrapped around the handle 110.

Thus, the manner in which embodiments of the invention are structured and function are very different compared to known chain magnetic stud finders and magnetic stud finders in which a magnet is integrated within a housing and is not movable relative to a handle. For example, such known devices have no flexible strip extending from a handle and do not have multiple spaced magnets on a flexible strip that is movable relative to a handle. Further, such devices lack a flexible strip with differential flexibility or stiffness. Moreover, chain stud detectors, by their nature, cannot extend or stand upwardly since the chain falls with gravity. Neither a chain nor integrated device has discrete magnetic elements or holes for marking. Additionally, chain stud finders include a single magnetic element at the bottom or distal end of the chain and that is swung by a user and therefore, have limited detection capabilities compared to the invention that can accommodate multiple magnets on the flexible strip. Moreover, given the nature of a chain, a chain can be swung in multiple planes whereas the flexible strip is structured to be flexible in a first plane but rigid in a second, perpendicular plane that is parallel to a plane defined by a wall being analyzed. Further, a chain is swung in the plane parallel to the wall whereas the flexible strip is rigid or has limited flexibility within this plane.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, it will be understood that the flexible strip may be made of various materials that provide differential flexibility such that in one plane, flexible strip is substantially rigid parallel to a wall surface whereas in another plane, the flexible member has a flexibility such that the flexible member can flex toward and away from the user depending on how the user moves the device along a wall, toward the wall and away from the wall and whether a magnet detects a nail, screw, fastener or other metallic element behind the wall. Moreover, while certain embodiments are described with reference to three magnets, other numbers of discrete magnets and other magnet spacing may be utilized. Further, while embodiments are described with reference to detecting a single nail, other individual fasteners may also be detected within non-metal studs, and metal studs may also be detected, which allows embodiments to be effectively utilized in residential and commercial construction that utilize wood and/or metal studs and metal fasteners.

Further, while certain figures illustrate one or two magnets being attracted to respective fasteners, it will be understood that a single magnet may be utilized to detect a single fastener in a non-metallic stud or a metal stud.

It will also be understood that embodiments may be structured such that the flexible member extends from the handle, and the flexible member is foldable partially or completely into the handle with one or multiple pivot points. For example, while certain embodiments are described with reference to a single handle a single flexible member with multiple magnets extending from the single handle, other embodiments may involve a handle with a first flexible member extending from a first end or side of a handle and a second flexible member extending from a second, opposite end or side of the handle. This would allow additional coverage of the wall with the same hand motion by the user. As another example, a flexible member with magnets may pivot out from a handle and extend from one end of the handle, whereas another flexible member with magnets extends from an opposite end of the handle. The device may also be integrated into a tool such as hammer, and the flexible member can be extended and retracted back into the hammer.

Moreover, while certain embodiments have been disclosed, it will be understood that different handle configurations may be utilized, and that a handle may be configured to be held within a user's hand such as between a thumb and forefinger, or the user's hand may wrap around the handle such that the user's fingers, for example, would be positioned between the handle and the wall while the flexible member and magnets are moved along the wall. Thus, during use of embodiments, the flexible member extends from the handle for detection such that no magnetic element is contained within the handle and magnetic elements are on or encased within the flexible member instead. Thus, in contrast to certain hand held stud finders that have a housing but no flexible member such as those in which the user's hand holds the housing and the magnets are positioned between the wall and the user's hand, embodiments involve magnets carried by the flexible member extending from the handle such that the user's hand is not positioned around magnets or on or around a housing including magnets, while the user's hand may wrap around the handle and may also be positioned between the wall and the handle.

Accordingly, while certain figures illustrate certain structural configurations, other embodiments may involve a combination of structural aspects of different embodiments illustrated in FIGS. 1A-6C. Moreover, other embodiments are directed to methods of use and methods of detecting a metallic object with a magnetic stud finder including a flexible member having magnets.

What is claimed is:

1. An apparatus for use in detecting at least one object hidden behind a wall or surface, the apparatus comprising:
   a handle having a proximal end and a distal end and configured for being grasped by a hand of a user; and
   a flexible member slidable within the handle such that the flexible member can slide between a retracted position and an extended position in which at least a portion of the flexible member extends beyond the distal end of the handle, the flexible member comprising a plurality of magnetic elements spaced apart from each other such that when a magnetic element is attracted to at least one hidden object, the flexible member bends to accommodate magnetic attraction between the at least one magnetic element and the at least one hidden object.

2. The apparatus of claim 1, the flexible member being configured to detect the at least one hidden object comprising a fastener within a wood stud.

3. The apparatus of claim 2, the plurality of magnets being arranged and having magnetic strength to detect a single fastener hidden within the wood stud.

4. The apparatus of claim 3, the flexible member being configured to detect the single fastener comprising a nail, a screw or a staple.

5. The apparatus of claim 1, the flexible member being configured to detect the at least one hidden object comprising a metal stud.

6. The apparatus of claim 1, the flexible member having differential stiffness such that the flexible member is more flexible in a first plane than in a second plane, the first plane being substantially orthogonal to the second plane defined by the wall or surface.

7. The apparatus of claim 1, the flexible member being configured to stand substantially upright when the handle and the flexible member in the extended position are arranged in an upright position.

8. The apparatus of claim 1, a longitudinal axis of the flexible member remaining substantially parallel to a longitudinal axis of the handle when the handle is oriented at an angle relative to a vertical axis.

9. The apparatus of claim 8, the angle comprising an angle of about 15 degrees to about 45 degrees.

10. The apparatus of claim 1, the flexible member comprising three magnets spaced apart from each other.

11. The apparatus of claim 1, the handle defining a slot and comprising a connector slidable along at least a portion of the handle, wherein a proximal portion of the flexible member is attached to the connector such that the flexible member can slide between the retracted position in which the flexible member is positioned inside of the slot defined by the handle and the extended position in which at least a portion of the flexible member extends beyond the distal end of the handle.

12. The apparatus of claim 1, wherein the flexible member is not a chain.

13. The apparatus of claim 1, the flexible member having a different shape compared to a shape of the handle.

14. The apparatus of claim 1, the flexible member being a different material compared to a material of the handle.

15. The apparatus of claim 1, the handle and the flexible member being positioned relative to each other such that the plurality of magnets is located distally of the distal end of the handle when the flexible member is in the extended position.

16. The apparatus of claim 1, the plurality of magnets being encased within the flexible member.

17. The apparatus of claim 1, the plurality of magnets being attached to the flexible member and exposed such that that one or more magnets can contact the wall or surface.

18. The apparatus of claim 1, wherein the plurality of magnets is not affixed within the handle due to the flexible member being slidable within the handle.

19. The apparatus of claim 1, wherein a distal end of the flexible member is configured to bend by a greater amount than a proximal end of the flexible member when the flexible member is in the extended position.

20. The apparatus of claim 1, the handle being configured such that a hand of the user can be wrapped around the handle to hold the handle while positioning or moving the flexible member by the user.

21. The apparatus of claim 1, the flexible member having a differential stiffness such that when the flexible member is in the extended position, the flexible member is positioned in an upright manner and remains substantially upright such that respective axes defined through respective centers of respective magnetic elements are substantially parallel to a ground plane.

22. The apparatus of claim 1, the flexible member being configured to fall and bend toward the ground as the handle is rotated when the flexible member is in the extended position.

23. An apparatus for use in detecting at least one object hidden behind a wall or surface, the apparatus comprising:
   a handle having a proximal end and a distal end and having a shape and size for being grasped by a hand of a user of the apparatus; and
   a flexible member slidable relative to the handle such that the flexible member can slide between a retracted position and an extended position in which at least a portion of the flexible member extends beyond the distal end of the handle, the flexible member comprising a plurality of magnetic elements spaced apart from each other and a differential stiffness such that the flexible member is more flexible in a first plane than a second plane, the first plane being substantially orthogonal to the second plane defined by the wall or surface, and when a magnetic element is attracted to at least one hidden object, the flexible member can bend to accommodate magnetic attraction between the at least one magnetic element and the at least one hidden object.

24. An apparatus for use in detecting at least one object hidden behind a wall or surface, the apparatus comprising:
   a handle having a proximal end and a distal end and configured for being grasped by a hand of a user; and
   a flexible, plastic strip slidable relative to the handle such that the flexible, plastic strip can slide between a retracted position and an extended position in which at least a portion of the flexible member extends beyond the distal end of the handle, the flexible, plastic strip comprising a plurality of magnetic elements spaced apart from each other and being arranged such that the plurality of magnetic elements is located distally of the distal end of the handle when the flexible, plastic strip is placed in the extended position.

25. The apparatus of claim 1, wherein all magnetic elements of the plurality of magnetic elements are ejected from the handle when the flexible member is in the extended position.

26. The apparatus of claim 1, wherein all magnetic elements of the plurality of magnetic elements are contained within the handle when the flexible member is in the retracted position.

27. The apparatus of claim 1, wherein a proximal end of the flexible member remains within the handle when the flexible member is placed in the extended position.

28. The apparatus of claim 11, the handle defining first slot along a longitudinal axis of the handle and a second slot through a side of the handle, wherein the flexible member can slide within the first slot, the apparatus further comprising a connector, wherein a proximal portion of the flexible member is attached to the connector such that translation of the connector within the second slot from a first position to a second position results in sliding of flexible member attached to the connector from the retracted position to the extended position.

29. The apparatus of claim 28, wherein the connector is a screw, a nut or a pin.

30. The apparatus of claim 1, wherein the strength of magnetic attraction between the at least one magnetic element and the at least one hidden object allows the apparatus to be maintained on the wall at the location of the at least one hidden object without support of or assistance by the user.

31. The apparatus of claim 1, wherein the strength of magnetic attraction between the at least one magnetic element and the at least one magnetic element does not allow the apparatus to be maintained on the wall at the location of the at least one hidden object such that the apparatus slides down or falls from the wall in the absence of user support or assistance.

32. An apparatus for use in detecting at least one object hidden behind a wall or surface, the apparatus comprising:
 a handle having a proximal end and a distal end and configured for being grasped by a hand of a user; and
 a flexible member slidable relative to the handle such that the flexible member can slide between a retracted position and an extended position in which at least a portion of the flexible member extends beyond the distal end of the handle, the flexible member comprising a plurality of magnetic elements spaced apart from each other such that when a magnetic element is attracted to at least one hidden object, the flexible member bends to accommodate magnetic attraction between the at least one magnetic element and the at least one hidden object.

\* \* \* \* \*